US010759266B2

(12) United States Patent
Stoffels et al.

(10) Patent No.: US 10,759,266 B2
(45) Date of Patent: Sep. 1, 2020

(54) METHOD FOR OPERATING A DRIVE UNIT COMPRISING AN INTERNAL COMBUSTION ENGINE AND AN ELECTRIC MACHINE AND DRIVE UNIT FOR CARRYING OUT SUCH A METHOD

(71) Applicant: Ford Global Technologies, LLC, Dearborn, MI (US)

(72) Inventors: Harald Stoffels, Cologne (DE); Christian Hofmann, Pulheim (DE); Stefan Quiring, Leverkusen (DE); Moritz Klaus Springer, Hagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 16/114,995

(22) Filed: Aug. 28, 2018

(65) Prior Publication Data
US 2019/0077245 A1    Mar. 14, 2019

(30) Foreign Application Priority Data
Sep. 8, 2017    (DE) .......... 10 2017 215 854

(51) Int. Cl.
| | |
|---|---|
| *B60K 6/387* | (2007.10) |
| *B60W 10/02* | (2006.01) |
| *B60K 6/48* | (2007.10) |
| *B60W 10/08* | (2006.01) |
| *B60W 10/115* | (2012.01) |

(Continued)

(52) U.S. Cl.
CPC ............ *B60K 6/387* (2013.01); *B60K 6/48* (2013.01); *B60W 10/02* (2013.01); *B60W 10/08* (2013.01); *B60W 10/115* (2013.01); *F02B 63/044* (2013.01); *F02D 41/0215* (2013.01); *F16H 3/728* (2013.01); *B60K 2006/4825* (2013.01);

(Continued)

(58) Field of Classification Search
CPC . B60K 6/38; B60K 6/387; B60K 6/48; B60K 2006/4825; B60W 10/02; B60W 10/06; B60W 10/08; B60W 20/10; B60W 20/13; B60W 20/40; F02D 41/0215; Y02T 10/6221; Y02T 10/6286; Y10T 477/26; Y10S 903/946
USPC .......... 477/5; 903/946; 180/65.23, 65.6, 69.6
See application file for complete search history.

(56) References Cited

U.S. PATENT DOCUMENTS

| | | | |
|---|---|---|---|
| 7,497,285 B1 * | 3/2009 | Radev ................. | B60W 10/08 180/65.225 |
| 2010/0255952 A1 * | 10/2010 | Diehl ................. | B60K 6/48 477/5 |

FOREIGN PATENT DOCUMENTS

DE    102014225193 A1    6/2016

OTHER PUBLICATIONS

Kroll, J. et al., "Mission CO2 Reduction," Proceedings of the 10th Shaeffler Symposium, Apr. 3, 2014, Baden-Baden, Germany, 22 pages.

* cited by examiner

*Primary Examiner* — Jacob M Amick
*Assistant Examiner* — Michael A Kessler
(74) *Attorney, Agent, or Firm* — Geoffrey Brumbaugh; McCoy Russell LLP

(57) ABSTRACT

The description relates to a method for operating a drive unit comprising an internal combustion engine, which is at least drive-connectable to an electric machine which delivers power to a drive train or receives power, and comprising at (Continued)

least one automatically actuable clutch, wherein the electric machine is at least drive-connectable to a manually shiftable transmission of the drive train, the manually shiftable transmission is shiftable without actuation of a clutch.

20 Claims, 5 Drawing Sheets

(51) Int. Cl.
     *F16H 3/72*        (2006.01)
     *F02D 41/02*      (2006.01)
     *F02B 63/04*      (2006.01)
     *F02D 41/04*      (2006.01)

(52) U.S. Cl.
     CPC ... *B60W 2510/244* (2013.01); *B60W 2540/10* (2013.01); *F02D 41/042* (2013.01)

METHOD FOR OPERATING A DRIVE UNIT COMPRISING AN INTERNAL COMBUSTION ENGINE AND AN ELECTRIC MACHINE AND DRIVE UNIT FOR CARRYING OUT SUCH A METHOD

CROSS REFERENCE TO RELATED APPLICATION

This application claims priority to German Patent Application No. 102017215854.9, filed Sep. 8, 2017. The entire contents of the above-referenced application are hereby incorporated by reference in their entirety for all purposes.

BACKGROUND AND SUMMARY

When developing drive units for vehicles, attempts are constantly being made to minimize fuel consumption. The aim is moreover to reduce pollutant emissions so that it is possible to observe future limit values for pollutant emissions. Therefore, according to the prior art, an electric drive is used more and more frequently in vehicles—generally in combination with an internal combustion engine as a hybrid drive.

In terms of lowering fuel consumption or reducing pollutant emissions, this is only advantageous if the electric drive has a greater efficiency in at least one operating range or engine map range than the internal combustion engine and therefore an advantage over the internal combustion engine, or if the drive energy necessary for the electric drive comes from energy recovery on board the vehicle or has been generated by regenerative, i.e. renewable, energy sources. Irrespective of this, the electric drive has its merits and advantages as an emission-free drive in inner-city traffic.

However, there are further relevant reasons for using electric drives, for example the reduction in the drive noise of a vehicle. The noise emissions of a motor vehicle, in particular the drive noises, not only have a disadvantageous effect on the quality of life or the wellbeing of people exposed to the noise, but also on their health, which is why a multitude of regulations have been established which stipulate the noise limit values to be observed. In this case, the most important regulations are the Federal Emission Control Act (BImSchG) and the guidelines of the European Commission.

However, the lack of drive noise of an electric drive also has disadvantages. If the electric machine is used as a drive unit in the two-pedal mode, the driver, owing to the lack of combustion noise from the internal combustion engine, is uncertain and uninformed as to whether and when it is necessary or advisable to shift transmission gears, i.e. when the gear should—preferably—be changed by manually shifting the transmission. Electric machine map-optimized operation of the electric machine is therefore random rather than achievable in an appropriately targeted manner. As a result, the potential offered by a hybrid drive remains at least periodically and at least partially unused.

Against the background of the above, it is the object of the present description to demonstrate a method for operating a drive unit as described herein, with which the operation and the control of the drive unit in the two-pedal mode, in which the electric machine is used as the drive unit, is improved.

Accordingly, the description relates to a method for operating a drive unit comprising an internal combustion engine, which is at least drive-connectable to an electric machine which delivers power to a drivetrain or receives power, and comprising at least one automatically actuable clutch, wherein the electric machine is at least drive-connectable to a manually shiftable transmission of the drive train, the transmission comprises a plurality of gears with which different transmission ratios can be realized, in a two-pedal mode, in which the electric machine is used as a drive unit, the transmission is manually shiftable without actuation of a clutch, and in a three-pedal mode, in which the internal combustion engine is used as a drive unit, the transmission is manually shiftable with actuation of a clutch.

The description furthermore relates to a drive unit for carrying out a method of the type mentioned above. A further partial object of the present description is to provide a drive unit for carrying out a method of this type. A drive unit of the type mentioned at the outset is used for example as a motor vehicle drive. Within the framework of the present description, the term internal combustion engine comprises diesel engines and gasoline engines, but also hybrid internal combustion engines which use a hybrid combustion method.

A drive unit comprising an internal combustion engine and an electric machine is generally also referred to as a hybrid drive. In the present case, as a drive unit for driving a vehicle, it is possible to use the electric machine exclusively in a two-pedal mode and the internal combustion engine exclusively in a three-pedal mode. However, it is also possible to use and operate the electric machine as a drive simultaneously along with the internal combustion engine. Both the internal combustion engine and the electric machine then deliver power to the drive train.

The present description may provide several advantages. In particular, the approach may improve drivetrain efficiency. Further, the approach may improve ease of driving a vehicle. Additionally, the approach may improve a human driver's confidence of operating a manual transmission.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1A:
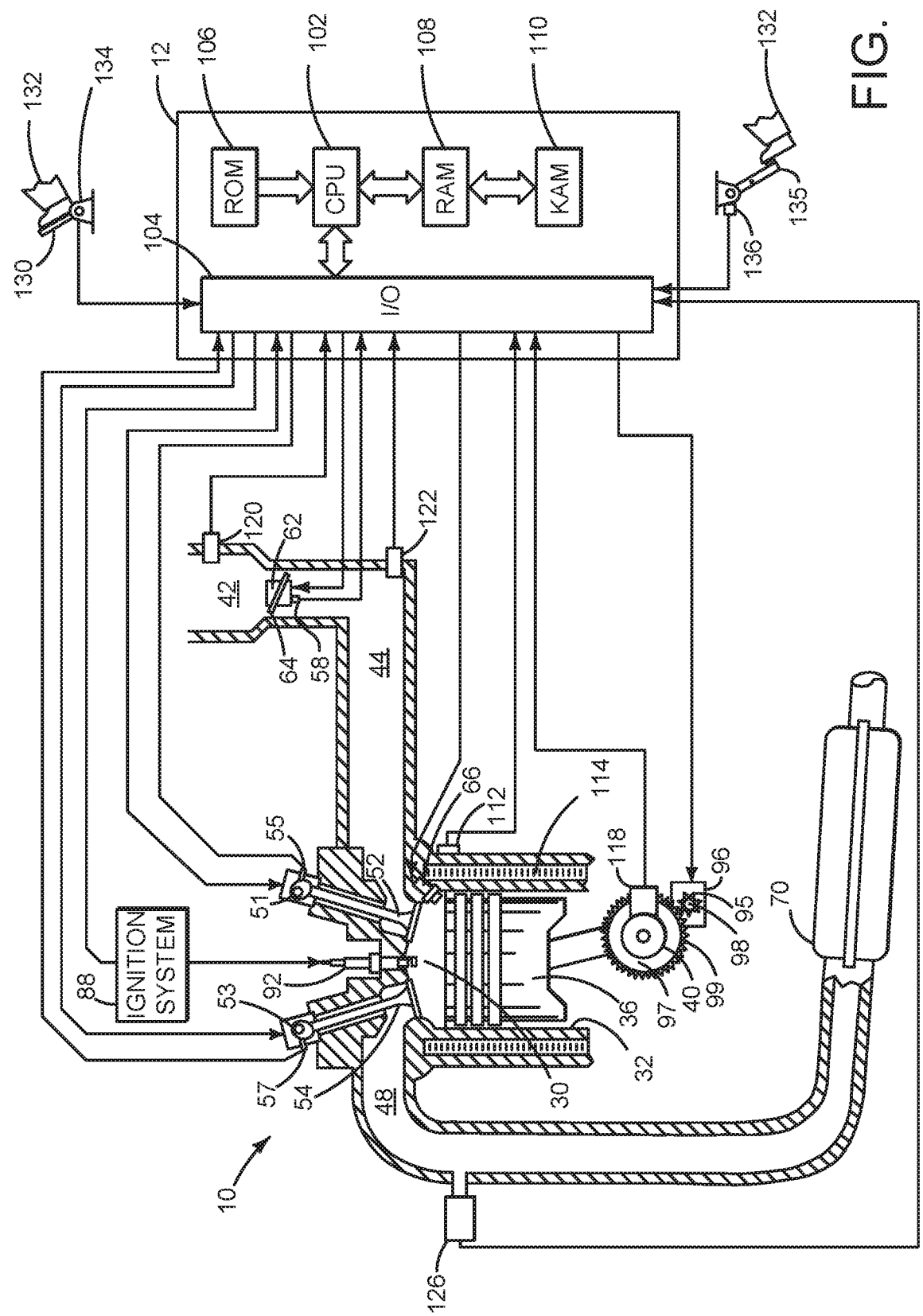
FIG. 1A is a schematic diagram of an engine.
Figure 1B:
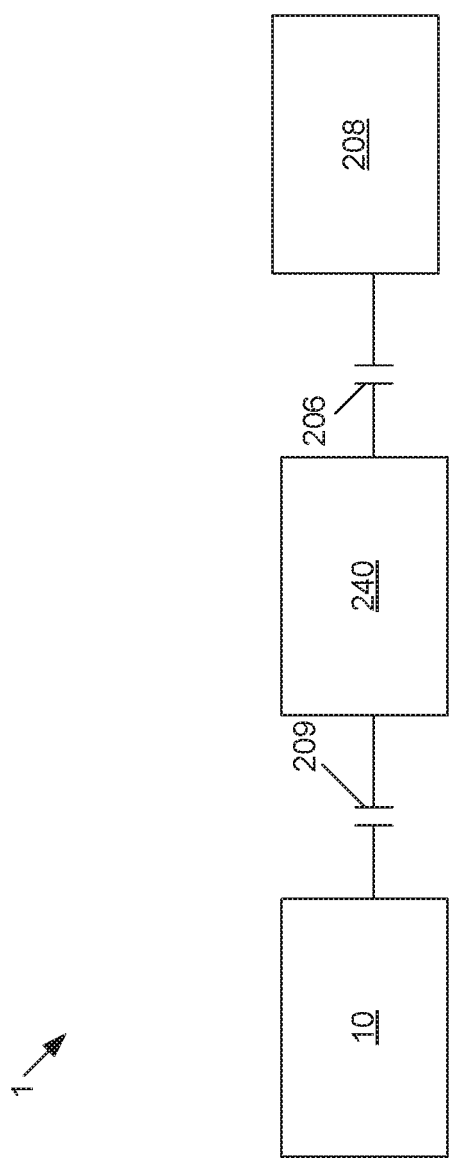
FIG. 1B is a schematic diagram of the engine of FIG. 1A in a drivetrain.
Figure 2:
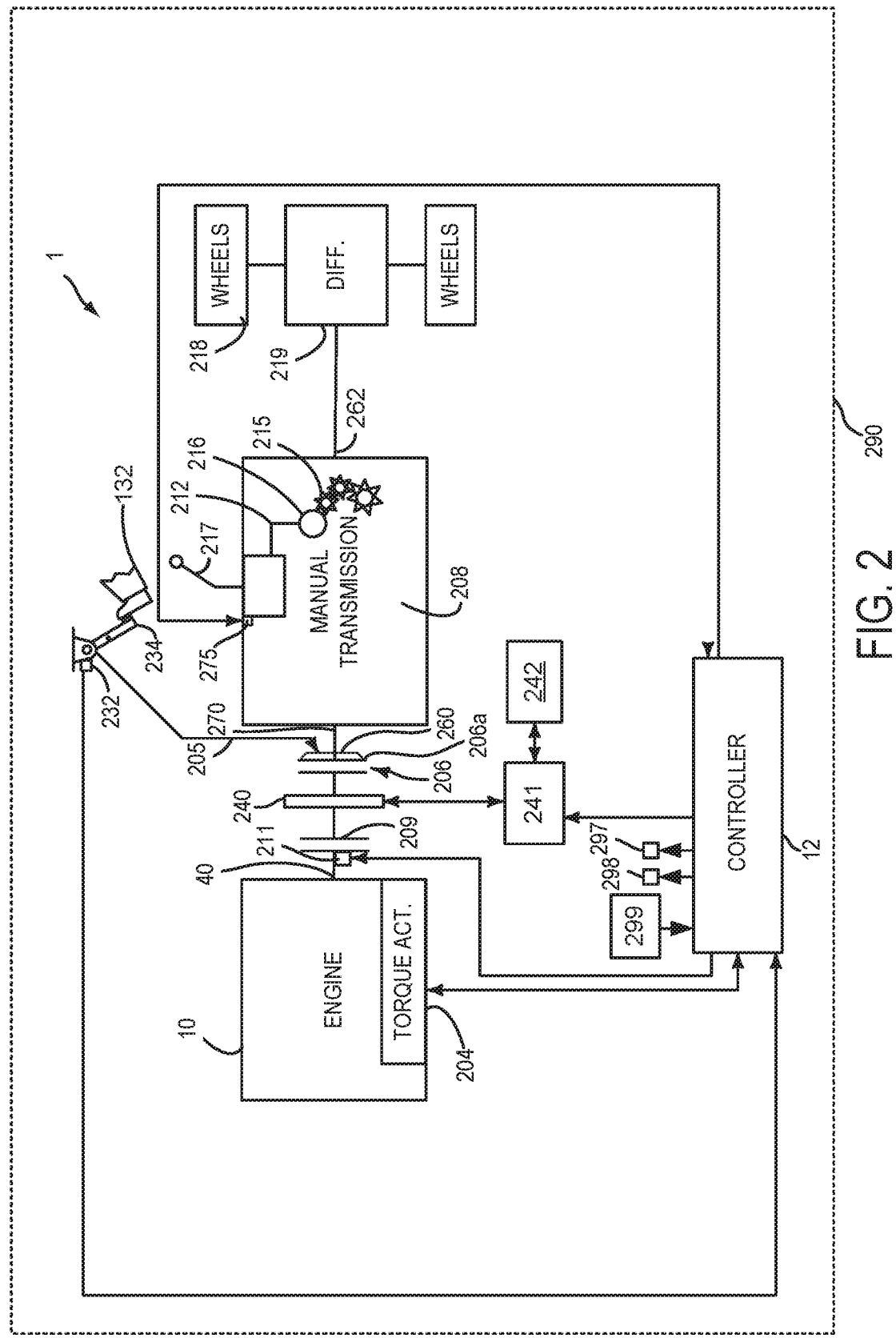
FIG. 2 shows a detailed diagram of the drivetrain of FIG. 1B.
Figure 3:
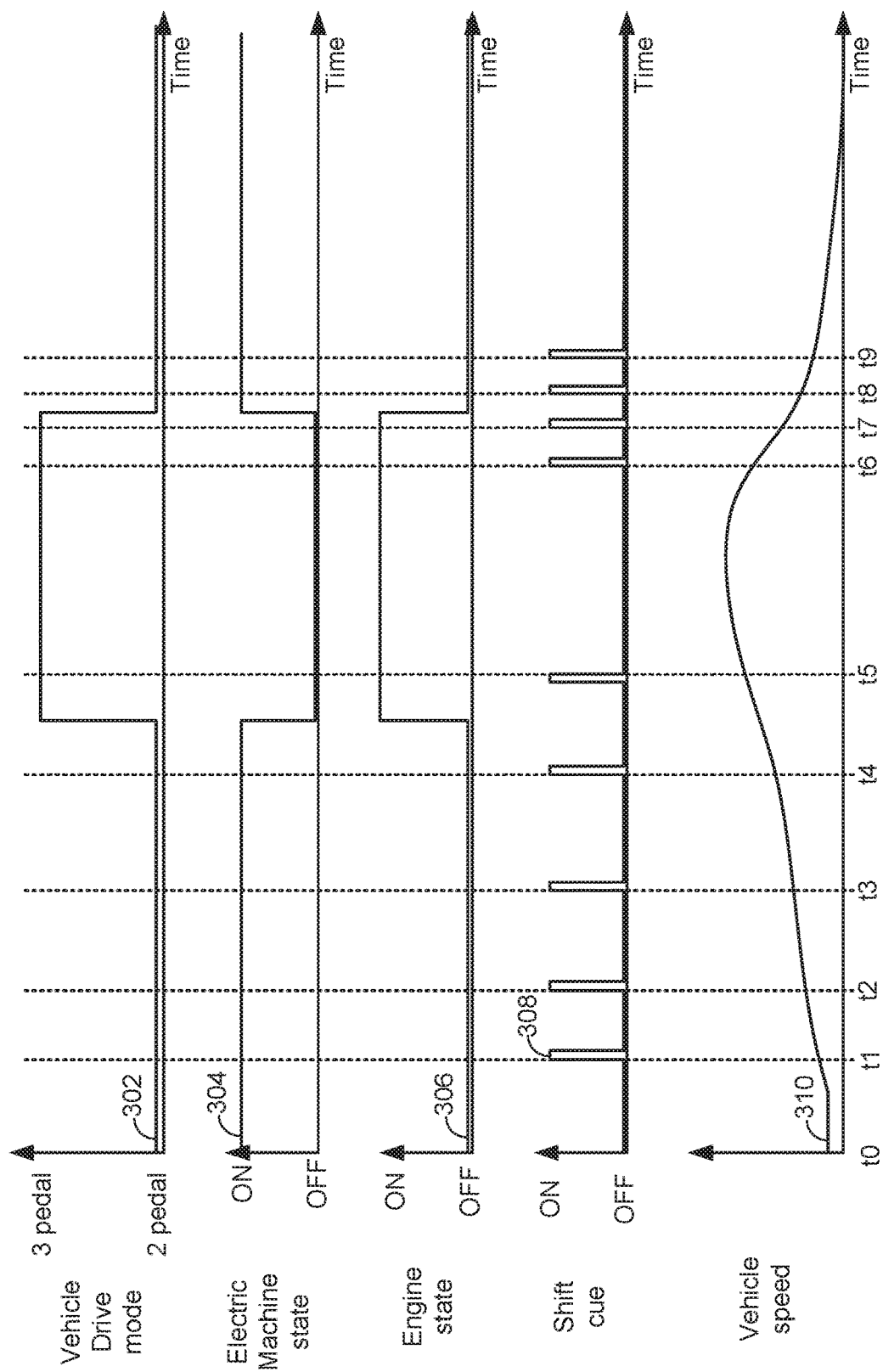
FIG. 3 shows example shifting sequence for a manual transmission.

The present description is related to operating a vehicle that includes an internal combustion engine and a manual transmission. A human driver may not be able to judge when it may be desirable to shift a manual transmission that receives power from an electric machine. Nevertheless, the human driver may receive cues from a vehicle to assist in the operation of manually shifting a manual transmission. A vehicle with a manual transmission may include an engine as shown in FIG. 1A. The engine may be included in a drivetrains as shown in FIG. 1B. A detailed view of the drivetrains is shown in FIG. 2. A vehicle operating sequence is shown in FIG. 3. The vehicle may be operated according to the method of FIG. 4.

Referring to FIG. 1A internal combustion engine 10, comprising a plurality of cylinders, one cylinder of which is shown in FIG. 1A, is controlled by electronic engine controller 12. The controller 12 receives signals from the various sensors shown in FIG. 1A and FIG. 2 and it employs the various actuators of FIGS. 1A and 2 to adjust engine and drivetrain operation based on the received signals and instructions stored on memory of controller 12. Engine 10 and electric machines described herein that provide torque to the vehicle drivetrain may be referred to as drivetrain torque sources.

Engine 10 includes combustion chamber 30 and cylinder walls 32 with piston 36 positioned therein and connected to crankshaft 40. Flywheel 97 and ring gear 99 are coupled to crankshaft 40. Crankshaft 40 rotates and selectively provides power to vehicle wheels via a drivetrain. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Fuel injector 66 deliver liquid fuel in proportion to pulse widths provided from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalytic bricks, in one example. In another example, multiple emission control devices, each with multiple bricks, can be used. Converter 70 can be a three-way type catalyst in one example.

A human driver 132 inputs a driver demand torque to controller 12 via accelerator pedal 130 and accelerator pedal position sensor 134. The driver demand torque may be a function of vehicle speed and accelerator pedal position. Human driver 132 also inputs a braking command to controller 12 via brake pedal 135 and brake pedal position sensor 136.

Controller 12 is shown in FIG. 1A as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 1B, a so-called P2 drivetrain configuration is shown, in which two automatically actuable clutches 209 and 206 are provided. Clutches 209 and 206 are provided both between the internal combustion engine 10 and the electric machine 240 and between the electric machine 240 and the manually shiftable transmission 208 of the drive unit or train 1.

The internal combustion engine 10 is drive-connectable to the electric machine 240 via a first clutch 209 and the electric machine 240 is drive-connectable to the manually shiftable transmission 208 of the drive train via a second clutch 206. As a generator, the electric machine 240 can receive power or feed power to the drivetrain. The transmission 208 comprises a plurality of gears with which different transmission ratios can be realized. The drive unit 1 can be operated in a two-pedal mode, in which the electric machine 240 is used as a drive, or in a three-pedal mode, in which the internal combustion engine 10 is used as a drive. In the two-pedal mode, in which the electric machine 240 of the drive unit 1 is used, the transmission 208 can be shifted manually without actuation of the second clutch 206. A device (shown in FIG. 2) provides a trigger or cue in the two-pedal mode if a shifting procedure is desirable, i.e. if manual shifting should take place and the gear should be changed. In the three-pedal mode, in which the internal combustion engine 10 of the drive unit 1 is used, the transmission 208 is shifted manually via human 132 (shown in FIG. 1A) with actuation of the second clutch 206.

FIG. 2 is a detailed block diagram of a vehicle drivetrain 1. Drivetrain 1 may be powered by engine 10 in vehicle 290. Engine 10 may be started with an engine starting system shown in FIG. 1A. Further, engine 10 may generate or adjust torque via torque actuator 204, such as a fuel injector, cam, throttle, etc.

An engine output torque may be transmitted from crankshaft 40 to automatically operated clutch 209 via clutch actuator 211. Automatically operated clutch 209 may be engaged or disengaged via electrical or hydraulic force. Automatically operated clutch may be opened or closed without input from human operator 132 to engage or disengage with electric machine 240.

Electric machine 240 is shown positioned between automatically operated clutch 209 and manually operated clutch 206. Alternatively, clutch 206 may be an automatically operated clutch. Electric machine 240 is directly coupled to output side automatically operated clutch 209 and an input side of manually operated clutch 206. Electric machine 240 may receive electrical power from electric energy storage device (e.g., a traction battery or capacitor) 242 via inverter 241 to propel vehicle 290. Controller 12 may command inverter 241 to supply electrical power to electric machine 240 so that electric machine 240 may provide positive torque to drivetrain 200. Alternatively, controller 12 may command inverter 241 to operate electric machine 240 in a generator mode so that electric energy storage device 242 may be charged. Electric machine 240 applies a negative torque to drivetrain 200 when electric machine 240 is operated as a generator.

An output side 260 of manually operated clutch 206 is directly coupled to input shaft 270 of transmission 208. A manually operated actuator 205 moves manually operated clutch plate 206a in a longitudinal direction to engage or disengage transmission input shaft 270 to the electric machine 240. Clutch actuator 205 may be comprised of a combination of mechanical, electrical, and hydraulic components. In one mode, a position of actuator 205 is adjusted to move proportionately with a position of clutch pedal 234 so that manually operated clutch 206 may be applied and released. A position of clutch pedal 234 is relayed to controller 12 via sensor 232. Clutch pedal 234 is in a base position when human driver 132 is not touching clutch pedal 234. Driver 132 applies force to move clutch pedal 234 from its base position so that manually operated clutch 206 may be opened when clutch pedal 234 is applied. Manually operated clutch 206 may be closed when clutch pedal 234 is released.

Input shaft 270 of manually operated transmission 208 may be selectively coupled to step ratio gears (e.g., gears 1-6) 215. The gears 215 are fixed ratio gears that provide different ratios between transmission input shaft 270 and output shaft 262. Gears 215 may freely rotate about the output shaft 262 and synchronizers 216 may be utilized to lock the gears to the output shaft 262. Gears 215 may be manually engaged and disengaged by opening clutch 206 and a human driver 132 moving manual gear selector 217 to individually engage gears 215 via shift forks 212 and synchronizers 216. Thus, gears of manual transmission 208 are not automatically changed or changed via non-human actuators such as solenoids. Closing clutch 206 may transfer power from electric machine 240 to wheels 218 when one of gears 215 is engaged via manual gear selector or shifter 217. Power may also be transferred from engine 10 to wheels 218 when automatically operated clutch 209 is closed and when manually operated clutch 206 is closed. Gear positions are reported to controller 12 via gear position sensors 275. Output shaft 262 links manual transmission 208 to wheels 218. In some examples, an axle and differential 219 with gears may be positioned between manual transmission 208 and wheels 218.

Controller 12 may be configured to receive inputs from engine 10 and accordingly control a torque output of the engine 10 and electric machine 240. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. Electric machine torque may be controlled via supplying electrical current to electric machine 240 including controlling field current of electric machine 240. In one example, controller 12 receives a driver demand power from accelerator pedal 130 and commands engine 10 to provide a first portion of the driver demand power. Controller also commands electric machine 240 to provide a second portion of the driver demand power.

Controller 12 may also receive input from a driver and provide status and data to a driver via a machine/human interface 299. The machine/human interface 299 may be a keyboard or touch screen device that provides visual cues to the human driver. Further, controller 12 may provide vehicle operation cues to the human driver via vibratory actuator 298 and audible actuator (e.g., speaker) 297. Vibratory actuator 298 may be coupled to a seat, accelerator pedal, steering wheel, shifter lever, or other device that may be in physical contact with the human driver so as to notify the human driver to take the suggested action (e.g., shifting the transmission via changing a gear position and opening and then closing the manually operated clutch).

Referring now to FIG. 3, an example shifting sequence for a vehicle that includes a manual transmission is shown. The shifting sequence of FIG. 3 applies to the drivetrain configurations shown in FIGS. 1B and 2. The sequence may be provided via the method of FIG. 4 in cooperation with the system of FIGS. 1A-2.

The first plot from the top of FIG. 3 is a plot of vehicle drive mode versus time. The vertical axis represents vehicle drive mode and the vehicle may operate in a two pedal or a three pedal mode. The modes are indicated along the vertical axis. The vehicle operates in two pedal mode when only the electric machine provides power to the vehicle wheels. In two pedal mode, the vehicle controller 12 receives input from the accelerator pedal and the brake pedal. The manual transmission 208 is shifted in two pedal mode via the human driver simply changing a position of a shifter 217 and without actuating the manual clutch 206. In two pedal mode, the vehicle controller 12 receives input from the accelerator pedal, the brake pedal, and the clutch pedal. The manual transmission 208 is shifted in three pedal mode via the human driver applying (e.g., disengaging) the manually operated clutch 206, changing a position of a shifter 217, and releasing (engaging) the manually operated clutch 206. The horizontal axis represents time and time increases from the left side of the figure to the right side of the figure. Trace 302 represents the vehicle drive mode during the sequence.

The second plot from the top of FIG. 3 is a plot of electric machine operating state versus time. The vertical axis represents electric machine operating state and the electric machine is on (e.g., consuming or providing electrical power) when trace 304 is near the vertical axis arrow. The electric machine is off (e.g., not consuming or providing electrical power) when trace 304 is near the horizontal axis arrow. The horizontal axis represents time and time increases from the left side of the figure to the right side of the figure. Trace 304 represents the electric machine operating state during the sequence.

The third plot from the top of FIG. 3 is a plot of engine operating state versus time. The vertical axis represents engine operating state and the engine is on (e.g., combusting fuel) when trace 306 is near the vertical axis arrow. The engine is off (e.g., not combusting fuel) when trace 306 is near the horizontal axis arrow. The horizontal axis represents time and time increases from the left side of the figure to the right side of the figure. Trace 306 represents the engine operating state during the sequence.

The fourth plot from the top of FIG. 3 is a plot of transmission shift cue or trigger indication state versus time. The vertical axis represents transmission shift cue or trigger indication state and the transmission shift cue or trigger indication is asserted (e.g., notifying the human driver to shift transmission gears) when trace 308 is near the vertical axis arrow. The transmission shift cue or trigger indication is off (e.g., not notifying the human driver to shift the transmission) when trace 308 is near the horizontal axis arrow. The horizontal axis represents time and time increases from the left side of the figure to the right side of the figure. Trace 308 represents the transmission shift cue or trigger indication state during the sequence.

The fifth plot from the top of FIG. 3 is a plot of vehicle speed versus time. The vertical axis represents vehicle speed and vehicle speed increases in the direction of the vertical axis arrow. The horizontal axis represents time and time increases from the left side of the plot to the right side of the plot. Trace 310 represents vehicle speed.

At time t0, the electric machine is operating as the sole source providing torque to the drivetrain. The vehicle is operating in a two pedal mode and the engine is off. The vehicle is traveling at a low constant speed and the shift cue or trigger is not asserted. The vehicle begins to accelerate just before time t1.

At time t1, the shift cue is asserted to request that the driver upshift to a higher gear of the manual transmission. The driver shifts gears of the manual transmission via moving a shift lever without applying the manually operated clutch (not shown). The shift cue is not asserted after the gear shift is completed. The electric machine continues to supply power to the drivetrain and the engine remains stopped. The vehicle speed continues to increase as time approaches t2.

At time t2, the shift cue is asserted again to request that the driver upshift to a higher gear of the manual transmission. The driver shifts gears of the manual transmission via moving a shift lever without applying the manually operated clutch (not shown). The shift cue is not asserted after the gear shift is completed. The electric machine continues to supply power to the drivetrain and the engine remains stopped. The vehicle speed continues to increase as time approaches t3.

At time t3, the shift cue is asserted again to request that the driver upshift to a higher gear of the manual transmission. The driver shifts gears of the manual transmission via moving a shift lever without applying the manually operated clutch (not shown). The shift cue is not asserted after the gear shift is completed. The electric machine continues to supply power to the drivetrain and the engine remains stopped. The vehicle speed continues to increase as time approaches t4.

At time t4, the shift cue is asserted again to request that the driver upshift to a higher gear of the manual transmission. The driver shifts gears of the manual transmission via moving a shift lever without applying the manually operated clutch (not shown). The shift cue is not asserted after the gear shift is completed. The electric machine continues to supply power to the drivetrain and the engine remains stopped. The vehicle speed continues to increase as time approaches t5, but before time t5 is reached, the engine is started and the electric machine is stopped (e.g., not consuming power from or providing power to the drivetrain) to meet an increasing driver demand power (not shown). The vehicle enters three pedal mode, exits two pedal mode, and clutch 209 is automatically closed to when the engine is started.

At time t5, the shift cue is asserted again to request that the driver upshift to a higher gear of the manual transmission. The driver shifts gears of the manual transmission via moving a shift lever and applying the manually operated clutch (not shown). The shift cue is not asserted after the gear shift is completed and the clutch pedal is released. The engine continues to supply power to the drivetrain and the electric machine remains stopped. The vehicle speed continues to increase after time t5, then the driver reduces the driver demand power (not shown) and vehicle speed begins to decrease.

At time t6, the shift cue is asserted again to request that the driver downshift to a lower gear of the manual transmission. The driver shifts gears of the manual transmission via moving a shift lever and applying the manually operated clutch (not shown). The shift cue is not asserted after the gear shift is completed and the clutch pedal is released. The engine continues to supply power to the drivetrain and the electric machine remains stopped. The vehicle speed continues to decrease after time t6.

At time t7, the shift cue is asserted again to request that the driver downshift to a lower gear of the manual transmission. The driver shifts gears of the manual transmission via moving a shift lever and applying the manually operated clutch (not shown). The shift cue is not asserted after the gear shift is completed and the clutch pedal is released. The engine continues to supply power to the drivetrain and the electric machine remains stopped. The vehicle speed continues to decrease after time t7 and the vehicle switches from three pedal mode to two pedal mode before time t8 is reached. The automatic clutch 209 is opened, the engine stops combustion, and the electric machine is activated to enter two pedal mode.

At time t8, the shift cue is asserted again to request that the driver downshift to a lower gear of the manual transmission. The driver shifts gears of the manual transmission via moving a shift lever without applying the manually operated clutch (not shown). The shift cue is not asserted after the gear shift is completed. The electric machine continues to supply power to the drivetrain and the engine remains stopped. The vehicle speed continues to decrease as time approaches t9.

At time t9, the shift cue is asserted a final time in the sequence to request that the driver downshift to a lower gear of the manual transmission. The driver shifts gears of the manual transmission via moving a shift lever without applying the manually operated clutch (not shown). The shift cue is not asserted after the gear shift is completed. The electric machine continues to supply power to the drivetrain and the engine remains stopped.

In this way, a human driver may be prompted to shift a manual transmission of a vehicle that is drivetrain power solely via an electric machine. This allows the electric machine to be operated in an efficient range to improve drivetrain efficiency.

Figure 4:
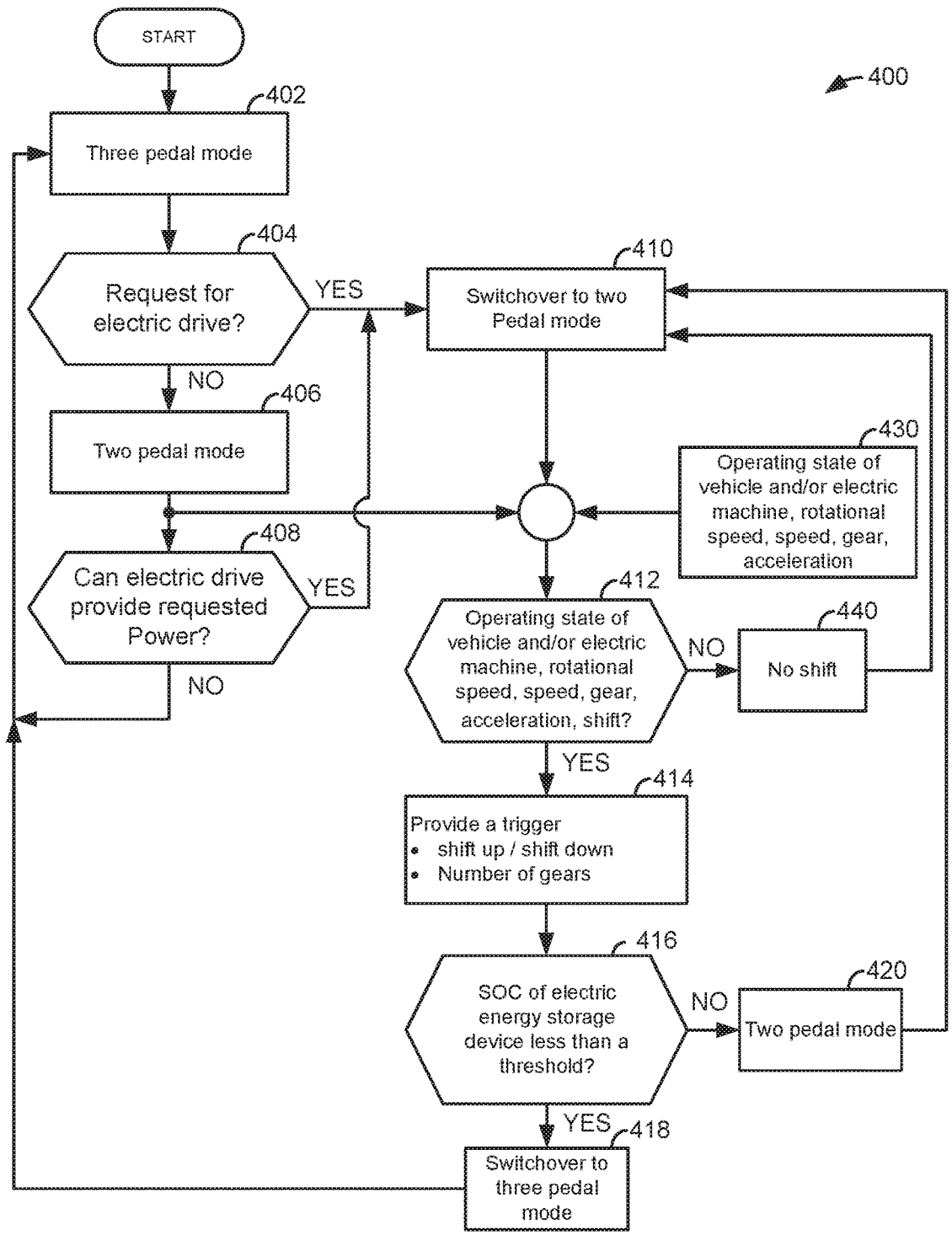
FIG. 4 shows a method for operating a hybrid vehicle drivetrain.

FIG. 4 shows a schematic view in the form of a flow chart of an embodiment of the method for operating the drive unit 1 illustrated in FIGS. 1A and 2. The method of FIG. 4 may be incorporated into and may cooperate with the system of FIGS. 1A-2. Further, at least portions of the method of FIG. 4 may be incorporated as executable instructions stored in non-transitory memory while other portions of the method may be performed via a controller and/or a human transforming operating states of devices and actuators in the physical world.

Starting from a three-pedal mode at 402, a changeover to the two-pedal mode takes place, possibly taking into account necessary boundary conditions, in the event of an explicit request at 404 (yes answer), for example on the part of the driver. If there is no such explicit request (no answer) at 404, it is nevertheless checked whether the electric machine, as such, would essentially be capable of providing the requested drive power at 408. If this is the case, a changeover to the two-pedal mode takes place without an explicit request and method 400 proceeds to 410. Otherwise, the three-pedal mode is maintained or sustained and method 400 returns to 402.

In the two-pedal mode, it is checked whether a shifting procedure is desired at 412, i.e. if there is a desire to change the gear and to shift the transmission manually for this without actuation of the second clutch. It may be desired to change transmission gears responsive to vehicle conditions 430 that are determined including but not limited to vehicle speed, presently engaged transmission gear, engine temperature, and driver demand power. If such a desired exists, a trigger is provided at 414, which signals the necessary shifting procedure. Within the framework of the requirement check and the provision of the trigger or cue, both the current operating state of the electric machine and the current operating state of the associated vehicle or drive train is taken into account. Engine map-optimized operation, in particular efficiency-optimized operation, of the electric machine is thus possible. If it is determined that shifting is not desired, the answer is no and method 400 proceeds to 440 where the presently engaged gear remains engaged and then method 400 returns to 410.

In the method variant according to FIG. 4, the provided trigger or cue indicates whether there is a requirement to shift up to a higher gear or to shift down to a lower gear and the number of gears to shift up or shift down.

The two-pedal mode is terminated if the accumulator or electric energy storage device (e.g., a battery) which supplies the electric machine with energy has or reaches a critical charge state. For example, if it is determined that battery state of charge (SOC) is less than a threshold state of charge, the answer is yes and method 400 proceeds to 418. Otherwise the answer is no and method proceeds to 420 and stays in two pedal mode. To transfer from the two-pedal mode to the three-pedal mode at 418, the manually operated (e.g., second) clutch is actuated, which, in the two-pedal mode, is not needed for engaging or shifting and can therefore be used in a different way, namely to terminate the two-pedal mode. Method 400 returns to 402.

The first partial object is achieved by a method for operating a drive unit comprising an internal combustion engine, which is at least drive-connectable to an electric machine which delivers power to a drive train or receives power, and comprising at least one automatically actuable clutch, wherein the electric machine is at least drive-connectable to a manually shiftable transmission of the drive train, the transmission comprises a plurality of gears with which different transmission ratios can be realized, in a two-pedal mode, in which the electric machine is used as a sole drive unit, the transmission is manually shiftable without actuation of a clutch, and in a three-pedal mode, in which the internal combustion engine is used as a drive unit, the transmission is manually shiftable with actuation of a clutch, which is characterized in that, in the two-pedal mode, at least one trigger is provided, which signals a necessary shifting procedure if there is a requirement to shift the transmission manually without actuation of a clutch.

To carry out the method according to the description, essentially only one automatically actuable clutch is necessary. That is to say it would be sufficient to equip the drive unit with an automatically actuable clutch such as is realized in a so-called P1 configuration, in which a clutch (e.g., 206) is provided between the electric machine and the manually shiftable transmission of the drive train, whereas the electric machine is drive-connected to the internal combustion engine directly, without the provision of a further clutch (e.g., clutch 209). However, methods for operating a drive unit are advantageous which comprise an internal combustion engine which is at least drive-connectable via a first clutch to an electric machine which delivers power to a drive train or receives power, wherein the electric machine is at least drive-connectable via a second clutch to a manually shiftable transmission of the drive train, the transmission comprises a plurality of gears with which different transmission ratios can be realized, in a two-pedal mode, in which the electric machine is used as a sole drive unit providing power to the vehicle's wheels, the transmission is manually shiftable without actuation of the second clutch, and in a three-pedal mode, in which the internal combustion engine is used as a drive unit, the transmission is manually shiftable with actuation of the second clutch, which are characterized in that, in the two-pedal mode, at least one trigger is provided, which signals a desired shifting procedure if there is a desire to shift the transmission manually without actuation of the second clutch. According to the method according to the description, information is given to the driver via the controller in the two pedal-mode as to whether and when it is desired to shift gears, i.e. when the gear should be changed by manually shifting the transmission.

To this end, at least one trigger or cue is provided, which signals a desired shifting procedure and thereby indicates the desire to shift manually via a human driver. The provision of a trigger signal—triggering a shifting procedure—enables engine map-optimized operation of the electric machine in the two-pedal mode, in particular efficiency-optimized operation of the electric machine as a drive unit. This enables the potential of a hybrid drive of the type discussed to be utilized—namely at any time, to its full extent and in a targeted manner. It is possible to use various criteria for transferring from the three-pedal mode to the two-pedal mode, for example an explicit request on the part of the driver.

The engine control or the navigation system of the vehicle can also request a switchover to the two-pedal mode. A request to essentially change to the two-pedal mode can also be stored or presented when the electric machine, as such, is capable of providing the requested drive power. When generating and providing a trigger signal—triggering a shifting procedure—the operating state of the vehicle and/or the electric machine can be taken into account; possibly also the operating state of the internal combustion engine. By means of the method according to the description, the first partial object on which the description is based, namely a method for operating a drive unit is demonstrated, with which the operation and the control of the drive unit in the two-pedal mode, in which the electric machine is used as a drive unit, is improved. Further advantageous method variants according to the are explained below.

Embodiments of the method are advantageous in which at least one trigger provided in the two-pedal mode via the controller indicates whether there is a desire to shift up to a higher gear or to shift down to a lower gear. It can essentially also be sufficient to inform the human driver in the two-pedal mode that the gear should be changed by manual shifting of the transmission. The driver will then generally select the correct gear intuitively, i.e. select a higher or a lower gear. However, the method variant discussed ensures that the driver selects the correct gear in any case during manual shifting and therefore prevents an operating error, i.e. incorrect or disadvantageous shifting.

According to the description, at least one trigger is provided via the controller. Within the framework of the above method variant, it would therefore be possible to provide a first trigger, which signals that manual shifting is desired, and a second trigger, which signals the type of shift desired, namely whether to shift up to a higher gear or to shift down to a lower gear. However, a single trigger could also be provided, which assumes both tasks, for example indicates which gear to shift to. This could take place by visually indicating the recommended gear via a human/machine interface. For the above reasons, embodiments of the method are also advantageous in which at least one trigger provided in the two-pedal mode indicates how many gears to shift up or down. Embodiments of the method are advantageous in which at least one trigger provided in the two-pedal mode is an optical trigger. A display in the dashboard or in the instrument panel (e.g., 299) could visualize a trigger, for example using arrows to indicate whether there is a requirement to shift up to a higher gear or to shift down to a lower gear. Which gear to shift to could also be indicated numerically.

Embodiments of the method are also advantageous in which at least one trigger provided in the two-pedal mode is an acoustic trigger (e.g., 297). An acoustic trigger is advantageous over an optical trigger in that the driver does not have to direct his vision towards the visualizing display and away from the road, for example. Embodiments of the method can also be advantageous in which at least one trigger provided in the two-pedal mode is a haptic trigger (e.g., 298). In this case, the focus is on the sense of touch.

Such a trigger could be designed in that a component with which the human driver is in contact, for example the steering wheel, the shift stick or the gas pedal, changes its surface feel, wherein the driver perceives a change through touch and, based on the type of change, can conclude that manual shifting is necessary and possibly the nature of the shift. Therefore, embodiments of the method can also be advantageous in which at least one trigger provided in the two-pedal mode is a vibrating trigger. Such a trigger could be designed in that a component with which the driver is in contact, for example the steering wheel, the shift stick or the gas pedal, vibrates or vibrates differently, wherein the driver perceives a vibration or change in the vibration through contact and, based on this or on the type of vibration, is able to conclude that manual shifting is necessary and possibly the nature of the shift.

Embodiments of the method are advantageous in which a clutch arranged between the internal combustion engine and the electric machine is opened in the two-pedal mode. This method variant takes into account the fact that the internal combustion engine is advantageously switched off in the two-pedal mode. To prevent or avoid drag of the unfueled internal combustion engine and to reduce the friction, it is advantageous to open a possibly provided clutch of the type described above in the two-pedal mode. Embodiments of the method are advantageous in which the two-pedal mode is terminated if an electric energy storage device, which supplies the electric machine with energy for driving purposes, has or reaches a predeterminable, i.e. critical charge state. An accumulator or capacitor, which can also receive and store unneeded excess power provided by the internal combustion engine if the electric machine is not used as a drive but as a generator, can serve as the energy store, for example. It is thus also possible to recover and store energy in coasting mode. In this connection, embodiments of the method are advantageous in which the two-pedal mode is terminated by actuating a clutch, for example the second clutch.

Since the transmission can be shifted manually via the human driver in the two-pedal mode without actuation of a clutch, the actuating device for this clutch, for example the clutch pedal, can be used in a different way in the two-pedal mode, in the present case for terminating the two-pedal mode. In this connection, embodiments of the method are also advantageous in which, starting from a switched-off internal combustion engine, the internal combustion engine is started, fueled and synchronized with the rest of the drive train during the switchover from the two-pedal mode to the three-pedal mode. Embodiments of the method are advantageous in which the electric machine which is at least connectable to the drive train is used to meet a requested additional power requirement as a switchable auxiliary drive when the internal combustion engine is fueled.

An additional power requirement which is requested and which the internal combustion cannot meet, or especially does not meet, is provided in the present case by the electric machine, which is at least connectable to the internal combustion engine or to the drive train and can function as a switchable auxiliary drive. Embodiments of the method are advantageous in which the electric machine which is at least drive-connectable to the internal combustion engine is used as a switchable generator to receive excess power provided by the internal combustion engine when the internal combustion engine is fueled. This method variant enables the internal combustion engine to be operated in an engine map point in which the amount of power provided is more than that requested. This is advantageous, for example, when the selected engine map point is notable for a high efficiency.

The excess power can be received and used by the electric machine operated as a generator.

Embodiments of the method can also be advantageous in which the electric machine which is connectable to the drive train is used to receive power from the drive train in coasting mode when the internal combustion engine is not fueled and to recover energy in this way. In this case, the electric machine operated as a generator generates a braking torque. Embodiments of the method are advantageous in which, within the framework of providing the at least one trigger, a current operating state of the electric machine is taken into account. This method variant enables the engine map of the electric machine used to be taken into account. It is thus possible, in particular, to take into account the fact that the electric machine has different efficiencies in different engine map ranges, i.e. an operation in one engine map range can be more advantageous than in another engine map range.

For the same reasons, embodiments of the method are advantageous in which, within the framework of providing the at least one trigger, a current operating state of a vehicle which uses the drive unit for driving purposes is taken into account. In this connection, embodiments of the method are advantageous in which the operating state of the vehicle is characterized by a plurality of operating parameters, wherein these operating parameters comprise vehicle speed, vehicle acceleration, current gear of the transmission, current rotational speed of a crankshaft of the internal combustion engine, current load request, and/or charge state of an energy store for electrical energy.

Embodiments of the method are advantageous in which, starting from the three-pedal mode, a changeover to the two pedal mode takes place if the electric engine is capable of providing the requested drive power. This method variant constitutes embodiments in which there is a request to essentially change to the two-pedal mode when the electric machine, as such, is capable of providing the requested drive power. The electric machine as a drive unit is therefore given priority over the internal combustion engine. That is to say the electric machine is essentially the preferred drive.

The second partial object, namely a drive unit for carrying out a method of the type above, is achieved by a drive unit comprising an internal combustion engine, which is at least drive-connectable to an electric engine which delivers power to a drive train or receives power, and comprising at least one automatically actuable clutch (e.g., not actuated by the human driver), in which the electric machine is at least drive-connectable to a manually shiftable transmission of the drive train, the transmission comprises a plurality of gears with which different transmission ratios can be realized, in a two-pedal mode, in which the electric machine is used as a drive unit, the transmission is manually shiftable without actuation of a clutch, and in a three-pedal mode, in which the internal combustion engine is used as a drive unit, the transmission is manually shiftable with actuation of a clutch, and which is characterized in that a device is provided which is designed to provide at least one trigger in the two-pedal mode, which signals a necessary shifting procedure if there is a requirement to shift the transmission manually without actuation of a clutch.

The above description relating to the method according to the description also applies to the drive unit according to the description, which is why, at this point, reference is made in general to the statements made with regard to the method variants. Drive units are advantageous which comprise an internal combustion engine which is at least drive-connectable via a first clutch to an electric machine which receives power or delivers power to a drive train, in which the electric machine is at least drive-connectable via a first clutch to a manually shiftable transmission of the drive train, the transmission comprises a plurality of gears with which different transmission ratios can be realized, in a two-pedal mode, in which the electric machine serves as a drive unit, the transmission is manually shiftable without actuation of the second clutch, and in a three-pedal mode, in which the internal combustion engine serves as a drive unit, the transmission is manually shiftable with actuation of the second clutch, and which is characterized in that a device is provided which is designed to provide at least one trigger in the two-pedal mode, which signals a necessary shifting procedure if there is a requirement to shift the transmission manually without actuation of the second clutch.

Embodiments of the drive unit are advantageous in which an additional accumulator is provided which can be used to assist the electric machine with delivering power and/or receiving power. Embodiments of the drive unit are also advantageous in which at least one capacitor is provided, which can be used to assist the electric machine with delivering power and/or receiving power. The capacitor stores the energy in the form of separate electrical charges and is notable for the potential for rapid discharge, i.e. for the ability to be able to rapidly provide large quantities of energy.

As will be appreciated by one of ordinary skill in the art, method described herein may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a drive unit comprising an internal combustion engine, which is at least drive-connectable to an electric machine which delivers power to a drive train or receives power, and comprising at least one automatically actuable clutch, wherein the electric machine is at least drive-connectable to a manually shiftable transmission of the drive train, the manually shiftable transmission comprises:

a plurality of gears with which different transmission ratios can be realized;

in a two-pedal mode, in which the electric machine is used as a sole drive unit providing power to vehicle wheels, the manually shiftable transmission is shiftable without actuation of a manual clutch, in the two-pedal mode, at least one trigger is provided via a controller, which signals a desired shifting procedure if there is a desire to shift the manually shiftable transmission manually without actuation of the manual clutch; and in a three-pedal mode, in which the internal combustion engine is used as a drive unit, the manually shiftable transmission is shiftable with actuation of the manual clutch.

2. The method of claim 1, for operating a drive unit, where the internal combustion engine is at least drive-connectable via the at least one automatically actuable clutch to an electric machine which delivers power to a drive train or receives power, wherein the electric machine is at least drive-connectable via the manual clutch to a manually shiftable transmission of the drive train, and wherein the two-pedal mode, at least one trigger is provided which signals a desired shifting procedure if there is a desire to shift the manually shiftable transmission manually without actuation of the manual clutch.

3. The method of claim 1, wherein at least one trigger provided in the two-pedal mode indicates whether there is a requirement to shift up to a higher gear or to shift down to a lower gear.

4. The method of claim 1, wherein at least one trigger provided in the two-pedal mode indicates the number of gears to shift up or shift down.

5. The method of claim 1, wherein at least one trigger provided in the two-pedal mode is an optical trigger.

6. The method of claim 1, wherein at least one trigger provided in the two-pedal mode is an acoustic trigger.

7. The method of claim 1, wherein at least one trigger provided in the two-pedal mode is a haptic trigger.

8. The method of claim 1, wherein at least one trigger provided in the two-pedal mode is a vibrating trigger.

9. The method of claim 1, wherein the automatically actuable clutch is opened in the two-pedal mode.

10. The method of claim 1, wherein the two-pedal mode is terminated if an energy storage device, which supplies the electric machine with energy for driving purposes, has a predeterminable charge state.

11. The method of claim 10, wherein the two-pedal mode is terminated by actuating the manual clutch.

12. The method of claim 1, wherein starting from when the internal combustion engine is switched-off, the internal combustion engine is started, fueled and synchronized with the rest of the drive train during switchover from the two-pedal mode to the three-pedal mode.

13. The method of claim 1, wherein the electric machine which is connectable to the drive train is used to meet a requested additional power requirement as a switchable auxiliary drive when the internal combustion engine is fueled.

14. The method of claim 1, wherein the electric machine which is drive-connectable to the internal combustion engine is used as a switchable generator to receive excess power provided by the internal combustion engine when the internal combustion engine is fueled.

15. The method of claim 1, wherein within the framework of providing the at least one trigger, a current operating state of the electric machine is determined.

16. The method of claim 1, wherein within the framework of providing the at least one trigger, a current operating state of a vehicle which uses the drive unit is determined.

17. The method of claim 16, wherein the operating state of the vehicle is characterized by a plurality of operating parameters, wherein these operating parameters comprise:
vehicle speed;
vehicle acceleration;
current gear of the manually shiftable transmission;
current rotational speed of a crankshaft of the internal combustion engine;
current load request; and
charge state of an energy store for electrical energy.

18. The method of claim 1, wherein starting from the three-pedal mode, a changeover to the two pedal mode takes place when the electric engine is capable of providing the requested drive power.

19. The method of claim 1, wherein the internal combustion engine is at least drive-connectable via the automatically actuable clutch to the electric machine, in which the electric machine is at least drive-connectable via the manual clutch to the manually shiftable transmission of the drive train, the manually shiftable transmission comprises a plurality of gears with which different transmission ratios can be realized, in a two-pedal mode, in which the electric machine serves as a sole power source delivering power to vehicle wheels, the manually shiftable transmission is shiftable without actuation of the manual clutch, and in a three-pedal mode, in which the internal combustion engine serves as a power source delivering power to vehicle wheels, the manually shiftable transmission is shiftable with actuation of the manual clutch, wherein a device is provided which is designed to provide at least one trigger in the two-pedal mode, which signals a desired shifting procedure if there is a desire to shift the manually shiftable transmission without actuation of the manual clutch.

20. A drive unit comprising:
an internal combustion engine, which is at least drive-connectable to an electric machine, which delivers power to a drive train or receives power, and comprising:
at least one automatically actuable clutch, in which the electric machine is at least drive-connectable to a manually shiftable transmission of the drive train, the manually shiftable transmission comprises a plurality of gears with which different transmission ratios can be realized; and
in a two-pedal mode, in which the electric machine is used as a sole drive unit providing power to vehicle wheels, the manually shiftable transmission is shiftable without actuation of a manual clutch; and
in a three-pedal mode, in which the internal combustion engine is used as a drive unit, the manually shiftable transmission is shiftable with actuation of the manual clutch, wherein a device is provided which is designed to provide at least one trigger in the two-pedal mode, which signals a desired shifting procedure if there is a desire to shift the transmission manually without actuation of the manual clutch.

* * * * *